United States Patent
Skinner, II et al.

[15] 3,665,960
[45] May 30, 1972

[54] AUDIBLE INDICATOR FOR SOLENOID VALVE

[72] Inventors: Frank R. Skinner, II; Robert T. Wigfall, both of St. Joseph, Mich.

[73] Assignee: Whirlpool Corporation

[22] Filed: Sept. 11, 1970

[21] Appl. No.: 71,541

[52] U.S. Cl. .................................137/551, 251/30, 340/396
[51] Int. Cl. .................................................F16k 37/00
[58] Field of Search..............137/554; 251/129, 30; 340/396

[56] References Cited

UNITED STATES PATENTS 3,114,532  12/1963  Gray et al. ..........................251/129 X
3,381,932  5/1968  O'Kane..............................251/30

Primary Examiner—Arnold Rosenthal
Attorney—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord

[57] ABSTRACT

A solenoid valve device having means for providing a signal when the solenoid is energized in the absence of fluid pressure at the inlet of the valve. The signal may comprise an audible sound and more specifically may comprise a tone having a frequency controlled by the frequency of the alternating current applied to the solenoid coil.

15 Claims, 6 Drawing Figures

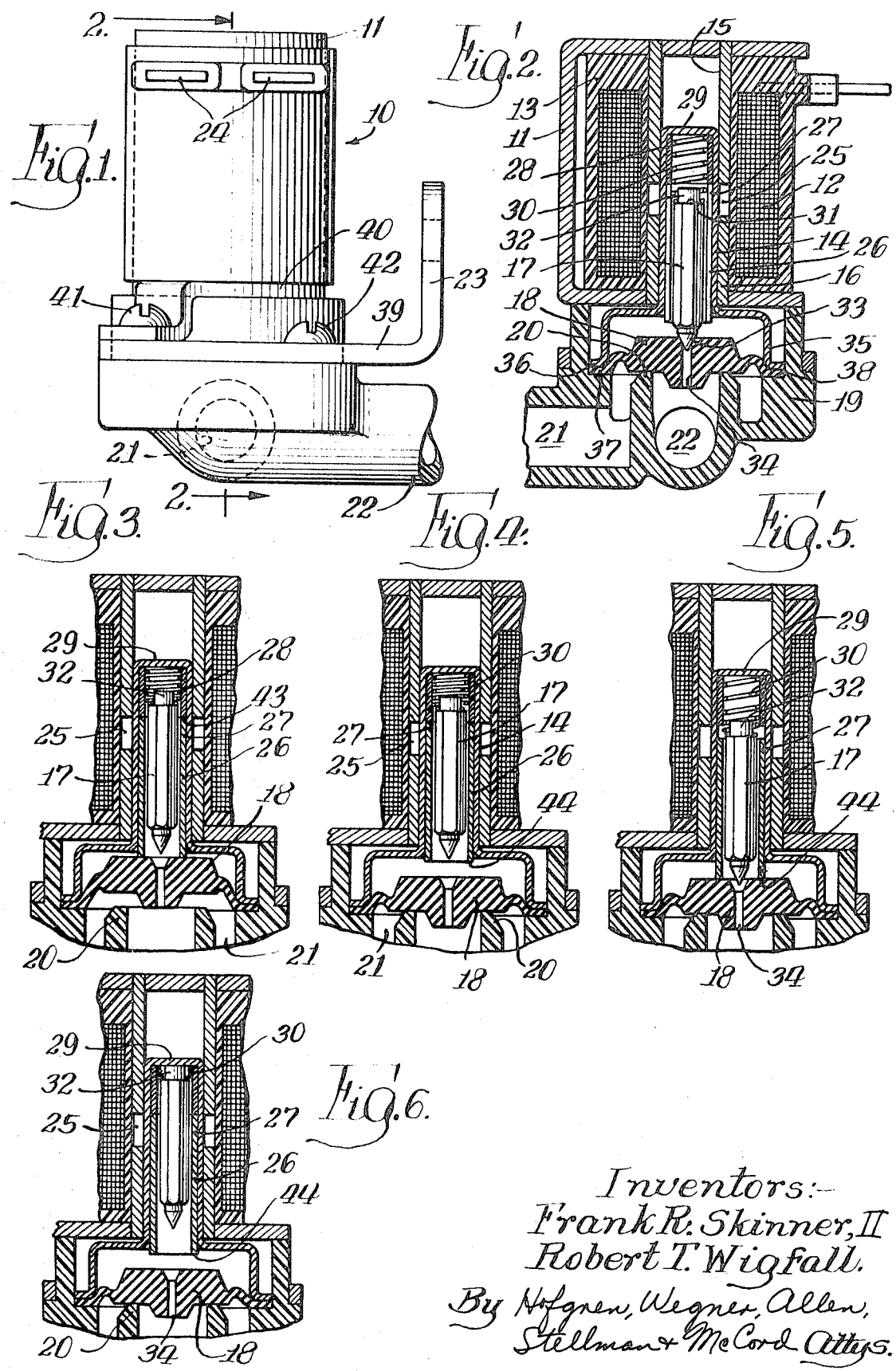

AUDIBLE INDICATOR FOR SOLENOID VALVE

BACKGROUND OF THE INVENTION

1. Field of the Invention

This invention relates to solenoid valves and in particular to solenoid valves having means for indicating the absence of fluid pressure at the inlet thereto.

2. Description of the Prior Art

In one conventional form of fluid control valve, the flow of fluid through the valve is controlled by a diaphragm which is selectively positioned by a plunger controlled by a solenoid coil. The plunger is biased to urge the diaphragm against a valve seat to maintain the valve closed. Energization of the solenoid coil moves the plunger electromagnetically against the biasing thereof to permit the diaphragm to be urged from the valve seat by the fluid pressure and thereby permit flow through the valve.

Such valves may be utilized in dishwashers and the like. A problem arises from time to time where the dishwasher is portable. In the use of conventional portable dishwashers, the user must turn on a water supply to deliver washing water through the valve. It has been found that at times the user neglects to turn on the water supply and unknowingly causes operation of the dishwasher through a complete cycle without providing any washing water thereto. Not only is this annoying, but operation of such water valves without water flow therethrough may damage the valve by overheating.

A number of valve structures has been developed for controlling fluid supply valve operation in such automatic appliances. In one such valve, the valve operation is controlled by pressure sensitive means. In another form of known valve, electrical contacts are provided in the outlet adapted to make contact upon flow of water through the outlet and thereby provide means for operating an alarm or gong. In still another form of known valve, a light is illuminated whenever the valve is energized.

SUMMARY OF THE INVENTION

The present invention comprehends the provision of a flow control valve having associated therewith means for providing a signal whenever the solenoid is energized without suitable fluid pressure being available to the valve for effecting the desired fluid flow therethrough.

More specifically the invention comprehends providing a solenoid operated valve having a plunger which is moved to close the valve.

Illustratively, the valve may comprise a movably closed diaphragm valve wherein the plunger is biased to urge the diaphragm sealingly across an annular valve seat controlling flow through the valve. The plunger is moved away from the diaphragm by energization of the solenoid coil to permit the diaphragm to become spaced from the valve seat and thereby permit fluid flow through the valve. Means are provided in association with the coil and plunger to utilize electrical energy of the coil to cause an audible signal in the event that fluid pressure is not available at the diaphragm.

In the illustrated embodiment, the plunger is adapted to strike the inner end of a plunger guide as a result of flux transfer from the energized coil when fluid pressure is not present in the valve to urge the diaphragm away from the valve seat to the open position. A control element in the form of a magnetic sheath is movably installed between the plunger and the coil for controlling the flux transfer to the plunger. When water pressure is not available in the valve, the flux control sheath causes the plunger to make an audible signal. When water pressure is available, the sheath is arranged so that the valve makes substantially no sound.

The sheath may comprise a tubular element having an outer end directly engageable by the diaphragm for selectively disposing the sheath across a flux transfer zone between the solenoid coil and the plunger to control the flux transmission for preventing the production of the warning sound. When the diaphragm is retained in an outer position on the valve seat out of engagement with the tubular sheath, the sheath may move with the plunger under the influence of the alternating current flux and thus provide an increased excursion of the plunger as a result of the varying flux transfer. In the extreme retracted position of the plunger, the sheath may effectively decrease the flux transfer for facilitating return of the plunger to its outer position, enhancing the forcible excursion of the plunger for producing the audible signal.

BRIEF DESCRIPTION OF THE DRAWING

Other features and advantages of the invention will be apparent from the following description taken in connection with the accompanying drawing wherein:

FIG. 1 is a side elevation of a solenoid valve device embodying the invention;

FIG. 2 is a vertical section thereof taken substantially along the line 2—2 of FIG. 1;

FIG. 3 is a fragmentary section thereof illustrating the arrangement of the valve in normal energized operation;

FIG. 4 is a fragmentary vertical section illustrating the arrangement of the valve with the solenoid energized but with no fluid pressure available at the diaphragm, the plunger being shown in a partially retracted position;

FIG. 5 is a view similar to that of FIG. 4 but with the plunger disposed approximately in the position whereat the alternating current applied to the coil passes through zero; and FIG. 6 is a view similar to that of FIG. 4 but with the plunger disposed approximately in the position whereat the alternating current reaches its peak.

DESCRIPTION OF THE PREFERRED EMBODIMENT

In the exemplary embodiment of the invention as disclosed in the drawing, a solenoid operated fluid control valve generally designated 10 is show to comprise a frame 11 in which an annular solenoid coil 12 is mounted in a suitable plastic jacket 13. A plunger guide 14 is mounted coaxially within an upper tubular insert 15 and a lower tubular insert 16 of guide 14. A plunger 17 is coaxially mounted within the guide 14 for controlling a diaphragm 18 in a valve housing 19. The diaphragm extends across an annular valve seat 20 for controlling fluid flow from an inlet 21 to an outlet 22 of the valve.

As seen in FIG. 1, a mounting bracket 23 may be provided for mounting the solenoid valve as desired. A pair of electrical terminals 24 may be provided for use in energizing coil 12 from a suitable source of electrical power such as a 120-volt, 60 cycle, AC source (not shown).

As best seen in FIG. 2, upper insert 15 is spaced from lower insert 16 to define an annular gap 25 therebetween for conducting flux inwardly from the inserts to plunger 17. The inserts are formed of magnetic material and the plunger guide is formed of a nonmagnetic material such as metal. Gap 25 defines a zone of high flux concentration. Control of the flux at zone 25 is provided by means of a movable magnetic cylinder 26 which has an upper end 27 which selectively extends across the radially inner end of gap 25 or is spaced therefrom. As best seen in FIG. 2, magnetic cylinder 26 is coaxially disposed about plunger 17 within guide 14. A nonmagnetic cylinder 28 is disposed coaxially within guide 14 at the inner end of the guide in abutment with an inner end wall 29 of the guide above the level of zone 25. A coil spring 30 is coaxially disposed in guide 14 to extend between end wall 29 and the inner end 31 of the plunger for biasing the plunger downwardly against the diaphragm 18 as shown in FIG. 2. The plunger further includes an upwardly projecting boss 32 defining a striking element as well as means for centering the lower end of coil 30 on the inner end 31 of the plunger.

The lower end of the plunger is provided with a frustoconical tip 33 which seats in an axial passage 34 in the diaphragm 18 at the lower extreme of travel of plunger 17. Plunger guide 14 is provided with a cup-shaped lower end 35 having an outturned flange 36 clamping the periphery 37 of the diaphragm against an annular shoulder 38 of the valve housing 19 surrounding inlet 21 of the valve.

Frame 11 may be supported on a horizontal portion 39 of bracket 23 by means of a depending portion 40 secured to the bracket portion 39 by suitable screws 41. Valve body 19 may be secured to the underside of bracket portion 39 by suitable screws 42.

The operation of solenoid valve device 10 is illustrated in FIGS. 3–6. As shown in FIG. 3, when fluid pressure is available at inlet 21, diaphragm 18 is urged upwardly from valve seat 20. The upward movement of diaphragm 18 urges magnetic cylinder 26 axially upwardly into abutment with the lower, outer end 43 of nonmagnetic cylinder 28. Thus, upper end portion 27 of cylinder 26 is disposed across the radially inner end of concentrated flux gap 25 thereby sheathing the plunger against maximum transfer of flux thereto from coil 12. The plunger is thusly energized by the reduced 60 cycle flux transfer from coil 12 and is normally disposed substantially above the diaphragm 18 in the position shown in FIG. 3 wherein striking element 32 is maintained spaced substantially below guide end wall 29, although limited oscillation of the plunger at this position may be caused by the 60 cycle flux. Thus, as long as normal water pressure is available at the diaphragm, the valve functions in this normal manner under control of the solenoid actuate plunger 17.

However, when water pressure is not available at inlet 21, diaphragm 18 is not urged upwardly, but rather, remains in engagement with seat 20 thereby being spaced below the lower, outer end 44 of the magnetic cylinder 26 which tends to move with magnetic plunger 17. Upon an initial peaking of the solenoid current, the plunger and cylinder move to a mid-position within guide 14 as seen in FIG. 4. In this position, upper end 27 of magnetic cylinder 26 sheathes the plunger from the concentrated flux gap 25.

As the magnetic flux decreases corresponding to a decrease in the 60 cycle current, the weakening of the flux permits plunger 17 to move downwardly under the urging action of spring 30, carrying with it the magnetic cylinder 26. When the flux passes through zero, the cylinder and plunger are in the lowermost position as shown in FIG. 5 wherein the lower end 44 of the cylinder abuts diaphragm 18, with the upper end portion 27 thereof partially unblocking the gap 25. As the flux again increases during the next half cycle of the alternating current, the magnetic attraction on plunger 17 urging it upwardly is relatively large causing the plunger to move forcibly upwardly against the biasing action of spring 30 sufficiently to cause element 32 on the upper end thereof to strike guide end wall 29 sharply. In this arrangement, as shown in FIG. 6, the lower end 44 of the cylinder 26 is spaced substantially above diaphragm 18 and cylinder portion 27 is again sheathing the plunger across gap 25. As the flux again returns to zero, coil spring 30 urges the plunger to the lowermost position of FIG. 5 thereby causing a maximum excursion of the plunger between the lowermost position of FIG. 5 and the uppermost position of FIG. 6 whereby a series of audible signals are generated by the repetitive striking of the guide wall 29 by the plunger element 32 producing a 120-cycle buzz or tone. Sound is also produced by the repetitive striking of cylinder 26 against cylinder 28, thereby creating a second 120-cycle buzz which adds to the aforementioned buzz produced by plunger element 32 to provide an audible indication of the state of the valve. The provision of the audible signal to the user effectively warns the user of the absence of fluid pressure in the valve.

Solenoid valve device 10 provides the improved control function in an extremely simple and economical manner. The cost of fixed cylinder 28 and movable magnetic cylinder 26 is very low and the installation thereof in the valve device is extremely simple. The sound producing means may be installed in existing valves by the simple expedient of replacing the existing plunger with reduced diameter plunger 17 and installing the cylinders 26 and 28 as shown in FIG. 2.

Thus, the invention provides an improved solenoid valve operation wherein an audible signal is provided by causing an increased excursion of the solenoid plunger whenever fluid pressure is not available at the valve inlet. The increased excursion of the plunger gives a clear indication of this condition by providing an audible signal suitable to warn the user.

The foregoing disclosure of specific embodiments is illustrative of the broad inventive concepts comprehended by the invention.

We claim:

1. In a solenoid device for selectively positioning a movable first member relative to a second member, structure comprising: an annular coil; a plunger coaxially with said coil carrying the movable member, said plunger being axially displaceable as a function of the magnetic flux produced by said coil acting on said plunger; means for causing an amplified excursion of the plunger as a result of alternating current energization of said coil when the second member is maintained in a preselected disposition; and means responsive to the increased excursion of the plunger for producing an audible signal to indicate the disposition of the second member in said preselected disposition, said plunger being provided with sound producing means and means being associated with the plunger and coil for causing said sound producing means to produce said preselected audible signal as the result of said second member being in said preselected disposition, said first and second members comprising valve members for controlling fluid flow as a function of the flux produced by said coil.

2. In a solenoid device for selectively positioning a movable valve member relative to a valve seat, structure comprising: an annular alternating current magnet coil; a plunger coaxially mounted on the said coil for positioning the movable valve member; plunger biasing means biasing the plunger to urge the movable valve member toward said valve seat; valve member biasing means for biasing the movable valve member to a preselected outer position, said valve member biasing means permitting the movable valve member to move toward the plunger to an inner position as the result of fluid pressure acting on said valve member toward said plunger; flux control means for controlling the flux generated by said coil acting on said plunger for controlling axial displacement of the plunger; means for producing a preselected audible signal as a result of the flux acting on said plunger cyclically reaching at least a preselected amount; and means causing said flux control means to limit the flux acting on the plunger to below said preselected amount when the movable member is in said inner position.

3. The solenoid device structure of claim 2 wherein said flux control means comprises a movable sheath between said plunger and said coil.

4. The solenoid device structure of claim 3 wherein said sheath is formed of magnetic material.

5. The solenoid device structure of claim 2 wherein said flux control means comprises a tubular sheath disposed coaxially about said plunger within said coil.

6. The solenoid device structure of claim 5 wherein said sheath is formed of magnetic material.

7. The solenoid device structure of claim 2 including a tubular plunger guide coaxially fixed within said coil and having an inner end wall, said signal producing means including a striking means movable against said end wall as an incident of said flux cyclically being at least said preselected amount.

8. The solenoid device structure of claim 2 including a tubular plunger guide coaxially fixed within said coil and having an inner end wall, said signal producing means comprising an element on said plunger arranged to strike said end wall at an extreme inward travel of said plunger.

9. The solenoid device structure of claim 8 wherein said signal producing means further includes said flux control means arranged to strike a fixed member within said plunger guide at an extreme inward travel of said flux control means.

10. The solenoid device structure of claim 2 wherein said flux control means comprises a tubular magnetic sheath coaxially movably disposed about said plunger for movement therewith, means for concentrating flux transfer from said coil to said plunger at a transfer zone, and means for disposing said sheath across said zone as an incident of movement of said valve seat to said inner position to cause said flux in the plunger being less than said preselected amount.

11. The solenoid device structure of claim 10 wherein said sheath includes an outer end engaged by said movable valve member when said movable valve member is in said outer position.

12. The solenoid device structure of claim 10 further including a fixed tubular stop coaxially inwardly of said sheath disposed to be engaged by said sheath for limiting the inward movement of the sheath.

13. The solenoid device structure of claim 12 wherein said tubular stop is formed of nonmagnetic material.

14. The solenoid device structure of claim 2 wherein said movable valve member comprises a diaphragm.

15. The solenoid device structure of claim 2 wherein the signal producing means causes the flux acting on the plunger to be at least said preselected amount and below said preselected amount seriatim in producing said audible signal.

* * * * *